(12) United States Patent
Baird et al.

(10) Patent No.: US 7,104,394 B2
(45) Date of Patent: Sep. 12, 2006

(54) CONVEYING APPARATUS WITH PIEZOELECTRIC DRIVER

(75) Inventors: Randy K. Baird, Bollivar, PA (US); Jeffery L. Cable, New Florence, PA (US); Garry Kostel, Latrobe, PA (US); Henry J. Nicolo, Homer City, PA (US); Dale Cameron, Rossiter, PA (US)

(73) Assignee: FMC Technologies, Inc., Houston, TX (US)

( * ) Notice: Subject to any disclaimer, the term of this patent is extended or adjusted under 35 U.S.C. 154(b) by 0 days.

(21) Appl. No.: 11/242,405

(22) Filed: Oct. 3, 2005

(65) Prior Publication Data

US 2006/0027443 A1 Feb. 9, 2006

Related U.S. Application Data

(62) Division of application No. 10/734,879, filed on Dec. 12, 2003, now Pat. No. 7,004,306.

(60) Provisional application No. 60/434,935, filed on Dec. 19, 2002.

(51) Int. Cl.
*B65G 27/24* (2006.01)
(52) U.S. Cl. ...................... 198/769; 198/766
(58) Field of Classification Search ............... 198/766, 198/769, 763
See application file for complete search history.

(56) References Cited

U.S. PATENT DOCUMENTS 2,382,863 A * 8/1945 Decker et al. ............... 221/10
2,661,830 A * 12/1953 Total ........................... 198/454
3,786,912 A * 1/1974 Taylor ......................... 198/769
4,275,978 A * 6/1981 Brooks et al. ............... 414/156
4,795,025 A * 1/1989 Doke et al. .................. 198/763
5,094,342 A * 3/1992 Kraus et al. ................. 198/761
5,472,079 A * 12/1995 Yagi et al. ................... 198/762
5,732,828 A * 3/1998 Littlefield, Jr. ............ 209/365.1
5,910,698 A * 6/1999 Yagi ......................... 310/316.03
5,967,294 A * 10/1999 Patterson et al. ........... 198/763
6,019,216 A * 2/2000 Patterson .................. 198/752.1
6,250,471 B1 * 6/2001 Ruthven et al. ............ 209/12.1
6,253,908 B1 * 7/2001 Gilman ....................... 198/769
6,465,932 B1 * 10/2002 Yagi ............................ 310/317
6,655,523 B1 * 12/2003 Jones et al. ................. 198/770
6,659,267 B1 * 12/2003 Patterson .................... 198/771
6,753,640 B1 * 6/2004 Kato et al. .................. 310/310

FOREIGN PATENT DOCUMENTS

| EP | 1 179 493 A3 | * | 1/2003 |
| JP | 61124412 | * | 6/1986 |
| JP | 62-218308 | * | 9/1987 |

* cited by examiner

*Primary Examiner*—Joe Dillon, Jr.
(74) *Attorney, Agent, or Firm*—Henry C. Query, Jr.

(57) ABSTRACT

A conveying apparatus comprises an elongated conveying bed which includes a proximal end and a distal end. A support structure for the conveying bed accommodates vibratory motion of a portion of the conveying bed extending from the proximal end a substantial distance toward the distal end but dampens vibratory motion at the distal end. In addition, a piezoelectric driver is operatively connected to the conveying bed adjacent the proximal end. Consequently, operation of the piezoelectric driver will induce a wave motion in the conveying bed which will effectively convey a material from the proximal end to the distal end.

8 Claims, 1 Drawing Sheet

CONVEYING APPARATUS WITH PIEZOELECTRIC DRIVER

This application is a divisional of U.S. patent application Ser. No. 10/734,879 filed on Dec. 12, 2003 now U.S. Pat No. 7,004,306, which is based on U.S. Provisional Patent Application No. 60/434,935 filed on Dec. 19, 2002.

BACKGROUND OF THE INVENTION

The present invention relates to a vibratory conveying apparatus for material-handling applications, and more particularly to a vibratory conveying apparatus which comprises a piezoelectric driver for inducing a directional wave motion in an associated conveying bed.

Vibratory conveyors have found widespread use in many material handling applications. These devices typically include a conveying trough which is mounted for vibratory motion and a mechanical or electromagnetic driver which induces the vibratory motion in the conveying trough. In mechanically driven vibratory conveyors, the driver creates differing acceleration forces during its opposite strokes to thereby induce a directional motion to the material in the trough. In electromagnetically driven vibratory conveyors, the conveying trough is mounted for angular movement and the driver therefore creates a force vector which advances the material through the trough. U.S. Pat. Nos. 5,967,294 and 6,019,216, which are both hereby incorporated herein by reference, illustrate these types of vibratory conveyors.

Efforts have been made to develop vibratory conveyors which employ piezoelectric drivers. Piezoelectric drivers typically comprise a ceramic or other non-metallic material which, when electrically excited, vibrates at a frequency and amplitude commensurate with the electrical excitation. Generally speaking, these types of vibratory conveyors have been configured somewhat similarly to electromagnetically driven vibratory conveyors, that is, with the conveying trough mounted for angular movement so that the vibratory motion of the piezoelectric driver creates a force vector which acts to move the material in the desired direction. U.S. Pat. Nos. 5,472,079, 5,910,678 and 6,465,932, and Japanese Patent No. 62-218308, which are hereby incorporated herein by reference, illustrate vibratory conveyors which employ piezoelectric drivers.

SUMMARY OF THE INVENTION

In accordance with the present invention, a conveying apparatus is provided for effectively conveying a material in a desired direction. The conveying apparatus comprises an elongated conveying bed which includes a proximal end and a distal end, a support structure for the conveying bed which accommodates vibratory motion of a portion of the conveying bed extending from the proximal end a substantial distance toward the distal end but dampens vibratory motion of the conveying bed at the distal end, and a piezoelectric driver which is operatively connected to the conveying bed adjacent the proximal end. In this manner, operation of the piezoelectric driver induces a wave motion in the conveying bed which conveys the material from the proximal end to the distal end.

In one embodiment of the invention, the piezoelectric driver may be operable at a frequency of between about 0 and 20 kilohertz. In addition, the piezoelectric driver may be operable at an amplitude of between about 0 and 0.002 inch. In another embodiment of the invention, the piezoelectric driver is operable at approximately the natural frequency of the conveying bed.

In contrast to known devices, therefore, the conveying apparatus of the present invention employs a piezoelectric driver to induce a directional wave motion in the conveying bed. The wave motion is limited to a single desired direction by damping the distal end of the conveying bed. In addition, the piezoelectric driver can be operated at different frequencies and amplitudes to accommodate variable feed rates for different materials being conveyed.

Other features and advantages of the present invention will be made apparent from the following detailed description, with reference to the accompanying drawings.

DETAILED DESCRIPTION OF THE PREFERRED EMBODIMENTS

Although the present invention may be embodied in various forms, it will be described and illustrated herein in the context of a presently preferred embodiment. Therefore, the following description should not be construed to limit the invention to the specific embodiment illustrated, but should instead be considered as merely an exemplification of the invention.

The conveying apparatus of the present invention employs a piezoelectric driver to induce a directional wave motion in the apparatus that is effective for conveying materials. The use of a piezoelectric driver facilitates the cost-effective manufacture and operation of the conveying apparatus. In addition, operation of the piezoelectric driver at varying amplitudes and frequencies facilitates the conveyance of different types of materials at varying feed rates.

Figure 1:
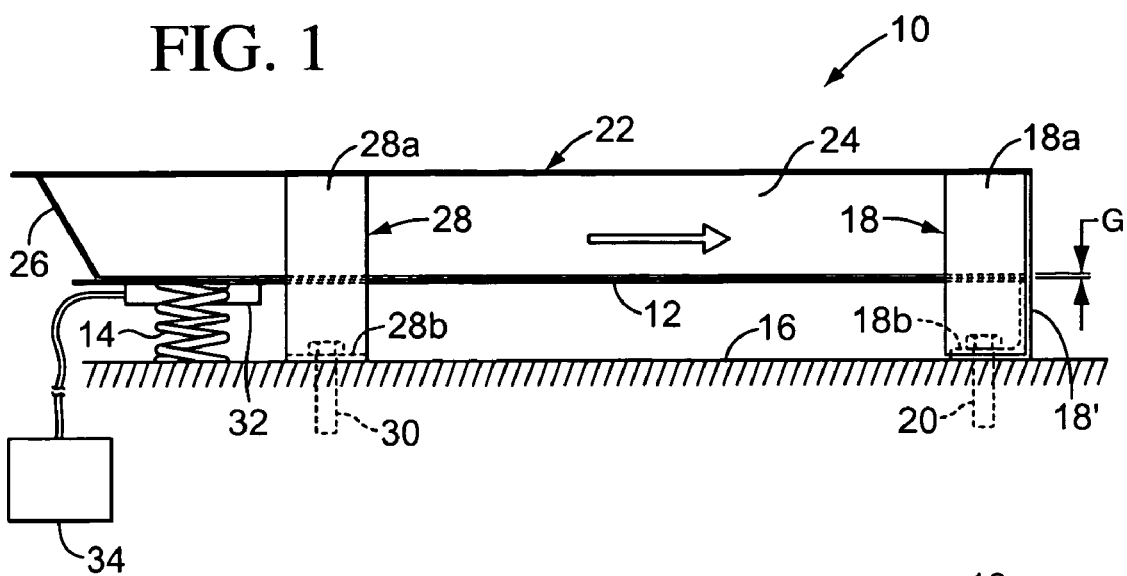
FIG. 1 is a side elevation view of the conveying apparatus of the present invention.
Figure 2:
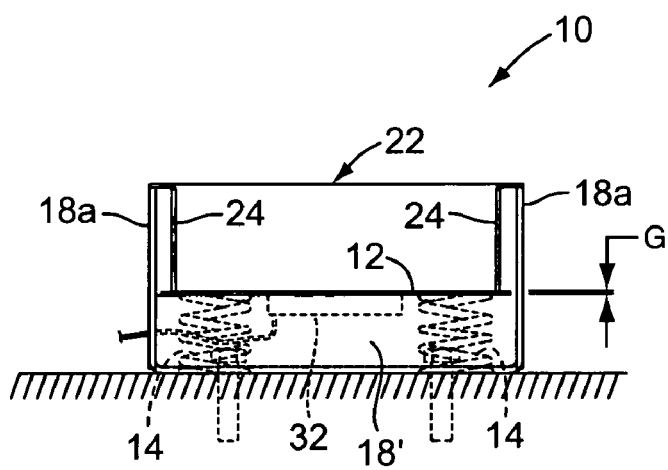
FIG. 2 is an end view of the conveying apparatus shown in FIG. 1.
Figure 3:
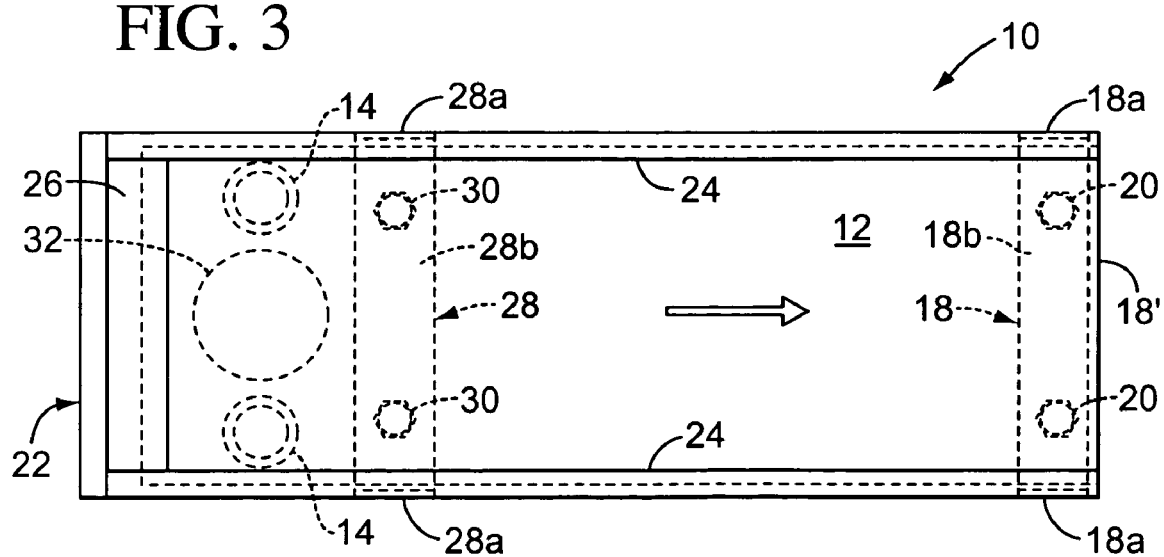
FIG. 3 is a top plan view of the conveying apparatus shown in FIG. 1.

Referring to FIGS. 1 through 3, the conveying apparatus of the present invention, which is indicated generally by reference number 10, comprises an elongated conveying bed 12 on which the material to be conveyed is supported. In operation, the material is conveyed from a proximal end of the conveying bed 12 (the left-hand end as viewed in FIG. 1) to a distal end of the conveying bed (the right-hand end as viewed in FIG. 1). Although the conveying bed 12 may comprise any suitable configuration, it is preferably generally plate-like in design. Thus, as shown most clearly in FIGS. 1 and 2, the conveying bed 12 ideally comprises a generally flat, generally rectangular metallic plate having a thickness of at least about 18 gauge. Such a configuration minimizes the driving requirements of the associated piezoelectric driver and facilitates the creation of the desired wave motion in the conveying bed 12.

In accordance with the present invention, the conveying apparatus 10 also comprises a support structure for the conveying bed 12 which accommodates vibratory motion of a portion of the conveying bed extending from the proximal end a substantial distance toward the distal end, but which dampens vibratory motion at the distal end. In the illustrated embodiment of the invention, the support structure includes at least one and preferably two isolation springs 14, e.g., compression coil springs, which support the proximal end of the conveying bed 12 above a static base structure 16, such as a floor upon which the conveying apparatus 10 is mounted. The support structure further includes a substantially rigid support member 18 which both supports the distal end of the conveying bed 12 and dampens vibratory motion thereat. The support member 18 may comprise a generally U-shaped configuration which is defined by a web portion 18a that extends between a pair of upstanding leg portions 18b. The web portion 18a is supported on and secured to the static base structure 16, such as by a pair of mechanical anchors 20, and the leg portions 18b extend upwardly on opposite sides of the distal end of the conveying bed 12. The support member 18 further comprises an end plate 18' to which the distal end of the conveying bed 12 is rigidly connected, such as by welding.

In order to prevent the material being conveyed from falling off the sides of the conveying bed 12, the conveying apparatus 10 preferably also comprises a static conveying trough 22 which is positioned in operative association with the conveying bed. The conveying trough 22 includes a pair of side walls 24, each of which is positioned proximate a respective side of the conveying bed 12. The sidewalls 24 are ideally positioned in closely spaced relation with respect to the conveying bed 12 so as to confine the material on, while not interfering with the vibratory motion of, the conveying bed. For example, the bottoms of the side walls 24 may be spaced from the top of the conveying bed 12 by a distance G which may be on the order of about 0.010 inch. The conveying trough 22 may also include an end wall 26 which extends between the side walls 24 generally upstream of the proximal end of the conveying bed 12. However, the opposite end of the conveying trough 22 is typically open so as to allow the conveyed material to move off the distal end of the conveying bed 12.

The conveying trough 22 is ideally connected to the static base structure 16 in a manner which isolates the conveying trough from the vibratory motion of conveying bed 12. In the illustrated embodiment of the invention, the conveying trough 22 is supported proximate the distal end of the conveying bed 12 by the leg portions 18b of the rigid support member 18, which are optimally joined to the conveying trough to dampen the vibratory motion thereof. The conveying trough 22 is preferably further supported by at least one additional static support structure 28, which is spaced apart from the rigid support member 18. The static support structure 28 may be provided with a generally U-shaped configuration similar to the rigid support member 18, with a web portion 28a extending between a pair of upstanding leg portions 28b. The web portion 28a is supported on and secured to the base structure 16 by a pair of suitable mechanical anchors 30. The leg portions 28b extend upwardly on opposite sides of the conveying bed 12 and are rigidly secured to the conveying trough 22. By this arrangement, the conveying trough 22 is mounted in a substantially fixed and static relationship with respect to the conveying bed 12.

In accordance with the present invention, the conveying apparatus 10 further comprises a piezoelectric driver 32 for generating the desired directional wave motion in the conveying bed 12. The piezoelectric driver 32 is operatively connected to the conveying bed 12 adjacent the proximal end thereof, preferably by substantially rigidly mounting the piezoelectric driver to the bottom surface of the conveying bed. Since the proximal end of the conveying bed 12 is supported by the isolation springs 14 and the distal end is firmly connected to the rigid support member 18, operation of the piezoelectric driver 32 will induce a directional wave along a substantial portion of the conveying bed in the direction indicated by the arrows in FIGS. 1 and 3. The resonance of the conveying bed 12 desirably acts to amplify the wave motion created by the piezoelectric driver 32, thereby creating a directional wave of sufficient magnitude to effect efficient movement of the material being conveyed.

The piezoelectric driver 32 can be driven by a suitable electrical controller 34, which can be operated to selectively vary the amplitude and frequency of vibration of the piezoelectric driver in a known and conventional fashion. In this regard, the piezoelectric driver 32 may be operated at a frequency at or near the natural frequency of the conveying bed 12 to facilitate the creation of the desired wave motion in the conveying bed.

In an exemplary embodiment of the conveying apparatus 10 in which the conveying bed 12 comprises an 18 gauge steel plate having a maximum width of 24 inches, the piezoelectric driver 32 is operated at a frequency of between about 0 and 20 kilohertz and at an amplitude of between about 0 and 0.002 inch. While the piezoelectric driver 32 may have a typical operational amplitude on the order of about 20 to 30 microns, operation of the piezoelectric driver at or near the natural frequency of the conveying bed 12 desirably acts to resonate the conveying bed to thereby amplify the driver motion. Selective variation in the operation of the piezoelectric driver 32 facilitates the handling of different types of materials, since the natural frequency of the conveying bed 12 will be affected by the type and quantity of the material being conveyed. A commercially available piezoelectric driver can be suitably employed in an application such as described above.

While the conveying apparatus 10 is configured for linear movement of materials, it is within the purview of the present invention that a conveying apparatus embodying the principles disclosed herein can be otherwise configured, such as by the provision of an arcuate conveying bed for inducing circular movement of the materials.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A conveying apparatus for conveying a material which comprises:
   an elongated conveying bed which includes a proximal end and a distal end;
   a support structure for the conveying bed which accommodates vibratory motion of a portion of the conveying bed extending from the proximal end a substantial distance toward the distal end but dampens vibratory motion of the conveying bed at the distal end; and
   a piezoelectric driver which is operatively connected to the conveying bed adjacent the proximal end;
   wherein operation of the piezoelectric driver induces a wave motion in the conveying bed which conveys the material from the proximal end to the distal end; and
   wherein the piezoelectric driver is operable at a frequency of between about 0 and 20 kilohertz.

2. The conveying apparatus of claim 1, wherein the piezoelectric driver is operable at an amplitude of between about 0 and 0.002 inch.

3. The conveying apparatus of claim 1, wherein the support structure comprises a static base structure, at least one isolation spring which is positioned between the proximal end and the base structure, and a rigid support member which is positioned between the distal end and the base structure.

4. The conveying apparatus of claim 1, further comprising a static conveying trough which includes a pair of side walls that are positioned adjacent opposite sides of the conveying bed.

5. The conveying apparatus of claim 4, wherein the conveying trough is supported proximate the distal end of the conveying bed by the rigid support member.

6. The conveying apparatus of claim 5, wherein the conveying trough is further supported by at least one static support member which is spaced apart from the rigid support member.

7. The conveying apparatus of claim 1, wherein the conveying bed comprises a generally flat plate.

8. The conveying apparatus of claim 7, wherein the plate comprises a thickness of at least about 18 gauge.

* * * * *